United States Patent [19]
Suenaga et al.

[11] Patent Number: 5,532,878
[45] Date of Patent: Jul. 2, 1996

[54] OBJECTIVE LENS SYSTEM FOR MICROSCOPE

[75] Inventors: Yutaka Suenaga; Itoe Hayashi, both of Yokohama, Japan

[73] Assignee: Nikon Corporation, Tokyo, Japan

[21] Appl. No.: 388,460

[22] Filed: Feb. 14, 1995

[30] Foreign Application Priority Data

Feb. 17, 1994 [JP] Japan ................................ 6-020192

[51] Int. Cl.$^6$ ................................................ G02B 21/02
[52] U.S. Cl. ........................ 359/657; 359/656; 359/660
[58] Field of Search ................................ 359/656, 657, 359/658, 659, 660

[56] References Cited

U.S. PATENT DOCUMENTS

| | | | |
|---|---|---|---|
| 3,537,772 | 11/1970 | Shoemaker | 359/659 |
| 3,598,474 | 8/1971 | Shoemaker | 359/659 |
| 3,700,311 | 10/1972 | Shoemaker | 359/656 |
| 3,746,428 | 7/1973 | Shoemaker | 359/657 |
| 3,902,793 | 9/1975 | Shoemaker | 359/659 |
| 4,232,940 | 11/1980 | Nakagawa | 359/658 |
| 4,373,785 | 2/1983 | Shoemaker | 359/656 |
| 4,376,570 | 3/1983 | Sussman | 359/659 |
| 4,537,472 | 8/1985 | Asoma | 359/658 |
| 5,270,860 | 12/1993 | Suzuki | 359/656 |

FOREIGN PATENT DOCUMENTS

| | | | |
|---|---|---|---|
| 54-11755 | 1/1979 | Japan | 359/658 |
| 59-155822 | 9/1984 | Japan | 359/658 |
| 61-240218 | 10/1986 | Japan | 359/656 |
| 6-160720 | 6/1994 | Japan | 359/656 |

Primary Examiner—Georgia Y. Epps
Assistant Examiner—Michael A. Papalas
Attorney, Agent, or Firm—Shapiro and Shapiro

[57] ABSTRACT

An objective lens system for a microscope comprises, sequentially from an object side, a first lens group having positive refracting power, a second lens group shiftable in an optical-axis direction and a third lens group. The first lens group has a cemented lens component composed of a plano-convex lens element with its plane surface toward the object side and a meniscus lens element with its concave surface toward the object side. The second lens group has a first sub-group having the positive refracting power and a second sub-group having negative refracting power. The second sub-group of the second lens group has a negative meniscus lens element with its concave surface toward an image side. The third lens group has a meniscus cemented lens component with its concave surface toward the image side. The objective lens system satisfies the following conditions:

$$-4.1 \times 10^{-3} < \frac{f}{(f_2 \times -\beta)} < 4.2 \times 10^{-3}$$

$$2.5 \times 10^{-3} < \frac{n_1}{n_2} \times \frac{R_1}{f \times \beta} < 8.3 \times 10^{-3}$$

$$3.3 \times 10^{-2} < \frac{R_2}{f \times -\beta} < 8.3 \times 10^{-2}$$

$$1.6 \times 10^{-2} < \frac{R_3}{f \times -\beta} < 4.2 \times 10^{-2}$$

$$8.3 \times 10^{-3} < \frac{d_1 + d_2}{f \times -\beta} < 5 \times 10^{-2}$$

5 Claims, 6 Drawing Sheets

OBJECTIVE LENS SYSTEM FOR MICROSCOPE

BACKGROUND OF THE INVENTION

1. Field of the Invention

The present invention relates to an objective lens system for a microscope of a liquid immersion type.

2. Related Background Art

Hitherto, there has been known a microscope objective lens in an oil immersion system, the arrangement being such that an oil fills in an optical path between a sample and the microscope objective lens in order to enhance a resolution. This type of known oil immersion system microscope objective lens is disclosed in, e.g., Japanese Patent Application Laid-Open Nos. 59-155822 and 61-240218.

When observing the sample by use of the above-described oil immersion system microscope objective lens, it is required that a space between the sample and the microscope objective lens be filled with the oil. For this reason, there is a possibility in which the oil is adhered to the microscope body and the objective lens in the oil immersion system microscope objective lens, resulting in a troublesome maintenance after the observation. Further, there exists such a possibility that a hand of the observer may be contaminated with this oil. The thus adhered oil is hard to clean off easily, and this may cause a problem to deteriorate the operability during the observation.

Then, if the water is used instead of employing the oil, the above deterioration in terms of the operability is to be obviated. The water, however, unlike the oil for the oil immersion, has a large difference in refractive index with respect to a cover glass covered on the surface of the sample. Accordingly, a spherical aberration is produced from this cover glass, with the result that a contrast of a sample image to be observed largely declines. Under this condition, it can be thought to optically design the microscope objective lens in consideration of the spherical aberration produced from the cover glass. If the thickness of the cover glass or the refractive index changes due to an error in terms of manufacturing, however, the spherical aberration caused by the cover glass also changes, and hence there arises a problem in which the well-formed image can not be obtained at all times.

SUMMARY OF THE INVENTION

Under such circumstances, it is a primary object of the present invention to provide a microscope objective lens capable of obtaining a well-formed image at all times even if a thickness of a cover glass or a refractive index changes without bringing about a deterioration of an operability.

To accomplish the above object, according to one aspect of the present invention, there is provided an objective lens system for a microscope, sequentially from an object side, comprising a first lens group having positive refracting power, a second lens group shiftable in an optical-axis direction and a third lens group. The first lens group has a cemented lens component composed of a plano-convex lens element with its plane surface toward the object side and a meniscus lens element with its concave surface toward the object side. The second lens group has a first sub-group having positive refracting power and a second sub-group having negative refracting power. The second sub-group has a negative meniscus lens element with its concave surface toward an image side. The third lens group has a meniscus cemented lens component with its concave surface toward the image side.

Further, the objective lens system according to the present invention satisfies the following conditions:

$$-4.1 \times 10^{-3} < \frac{f}{(f_2 \times -\beta)} < 4.2 \times 10^{-3} \quad (1)$$

$$2.5 \times 10^{-3} < \frac{n_1}{n_2} \times \frac{R_1}{f \times \beta} < 8.3 \times 10^{-3} \quad (2)$$

$$3.3 \times 10^{-2} < \frac{R_2}{f \times -\beta} < 8.3 \times 10^{-2} \quad (3)$$

$$1.6 \times 10^{-2} < \frac{R_3}{f \times -\beta} < 4.2 \times 10^{-2} \quad (4)$$

$$8.3 \times 10^{-3} < \frac{d_1 + d_2}{f \times -\beta} < 5 \times 10^{-2} \quad (5)$$

where f: the focal length of the whole system, $f_2$: the focal length of the second lens group, $\beta$: the lateral magnification of the microscope objective lens, $n_1$: the refractive index of the plano-convex lens element of the first lens group, $n_2$: the refractive index of the meniscus lens element of the first lens group, $R_1$: the radius of curvature of an object-side lens surface of the meniscus lens element of the first lens group, $R_2$: the radius of curvature of an image-side lens surface of the negative meniscus lens element of the second sub-group, $R_3$: the radius of curvature of an image-side lens surface of the cemented lens component of the third lens group, $d_1$: the air spacing between the first and second lens groups, and $d_2$: the air spacing between the second and third lens groups.

According to the present invention which is thus constructed, the second lens group is so provided as to be shiftable along the optical-axis direction. Consequently, the spherical aberration caused through the microscope objective lens changes with the shift of this second lens group. It is thus possible to correspond to the change in the spherical aberration produced with the variation in the thickness of the cover glass or in the refractive index.

Note that the second lens group is desirably constructed of, sequentially from the object side, a positive first sub-group having positive refracting power and a negative second sub-group having negative refracting power according to the present invention. Herein, when shifting the second lens group along the optical-axis direction, there is changed an incident height of a Rand ray (ray penetrating the most marginal area of the optical system among rays emitted from one point on the optical axis: marginal ray) from an object through the first lens group. In the case of the above configuration, when the second lens group shifts along the optical-axis direction, the incident height with respect to the first sub-group varies, and, therefore, an angle of refraction of the Rand ray through the first sub-group changes. At this time, there are changed the angle of incidence and the incidence height of the Rand ray with respect to the image-side lens surface of the negative meniscus lens element in the second sub-group. Consequently, a quantity of the spherical aberration produced on this image-side lens surface also varies. Accordingly, the second lens group may be shifted corresponding to the variation in the spherical aberration that is caused with the changed in the thickness of the cover lens or in the refractive index.

Given hereinbelow is a detailed description of the conditional expressions according to the present invention.

A condition (1) defines a preferred range of the refracting power of the second lens group with respect to the refracting power of the whole system. As in the present invention, when the second lens group is shifted along the optical-axis direction, a corrected state of the spherical aberration changes, and, at the same time, a focal surface of the microscope objective lens also changes. Herein, when exceeding upper and lower limits of the condition (1), the refracting power of the second lens group becomes too large, and hence a shift quantity of the focal surface with the shift of the second lens group remarkably increases. At this time, it is difficult for an observer to detect a position of the second lens group enough to correct the spherical aberration produced from the cover glass. That is, it is undesirably hard to discriminate whether an image blur of the sample to be observed is derived from the spherical aberration or the shift of the focal surface.

Note that the upper limit of the condition (1) is set to, preferably, $1.6 \times 10^{-3}$ in order to reduce the variation in the focal surface position depending on the shift of the second lens group. Further, the lower limit of the condition (1) is set to, preferably, 0 in order to obtain a good image forming performance by restraining especially a curve of the spherical aberration down to a small level.

The condition (2) is concerned with a correction of a Petzval's sum. In the microscope objective lens according to this invention, the cemented surface of the cemented lens component of the first lens group has large negative refracting power, thus correcting a curvature of field. Herein, if over an upper limit of the condition (2), the correction of the Petzval's sum becomes insufficient, and this undesirably results in worsening a planarity of the image surface. Further, if under a lower limit of the condition (2), the spherical aberration and the comatic aberration occur excessively, and, undesirably, a well-balanced correction of the aberrations can not be obtained.

If a further planarity of the image surface is required, it is desirable that the upper limit of the condition (2) be set to $6.7 \times 10^{-3}$. It is also desirable that the lower limit of the condition (2) be set to $4.16 \times 10^{-3}$ in order to reduce the occurrences of the spherical aberration and the comatic aberration.

The present invention adopts such a construction that the variation in the spherical aberration due to the change in the thickness of the cover glass is corrected by shifting the second lens group. It is therefore a better way to give an overcorrection in the corrected state of the spherical aberration of the second lens group. Then, the condition (3) according to the present invention prescribes the radius of curvature of the image-side lens surface of the negative meniscus lens element of the second sub-group of the second lens group, thereby regulating the spherical aberration caused from the image-side lens surface.

Herein, if under a lower limit of the condition (3), undesirably a high-order spherical aberration is largely produced in the second lens group. Further, if above the upper limit of the condition (3), the overcorrected state of the spherical aberration in the second lens group is reduced. At this time, undesirably the spherical aberration is not well corrected during the shift of the second lens group. In particular, the upper limit of the condition (3) is set to, preferably, $6 \times 10^{-2}$ in order to provide the well-corrected state of the spherical aberration when shifting the second lens group.

The condition (4) prescribes the negative refracting power on the image-side lens surface of the cemented lens component of the third lens group. In the microscope objective lens according to the present invention, the large negative refracting power is produced on this lens surface, thereby effecting the correction of the Petzval's sum. If above an upper limit of the condition (4), an undercorrected state of the Petzval's sum is undesirably induced. Further, if under a lower limit of the condition (4), the remarkable spherical aberration and comatic aberration are undesirably caused.

The condition (5) prescribes front-and-rear air spacings of the second lens group shifted to correct the variation in the spherical aberration due to the change in the thickness of the cover glass. Herein, if under a lower limit of the condition (5), a movable space for the second lens group is decreased, with the result that the variation in the spherical aberration can not be undesirably thoroughly corrected. Besides, if above an upper limit of the condition (5), a space occupied by the first and third lens groups is restricted, and a configuration for well correcting the aberration is undesirably hard to take. If a further improvement of the image forming performance is required, the upper limit of the condition (5) is set to, desirably, $3.9 \times 10^{-3}$.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be discussed with reference to the drawings.

Figure 1:
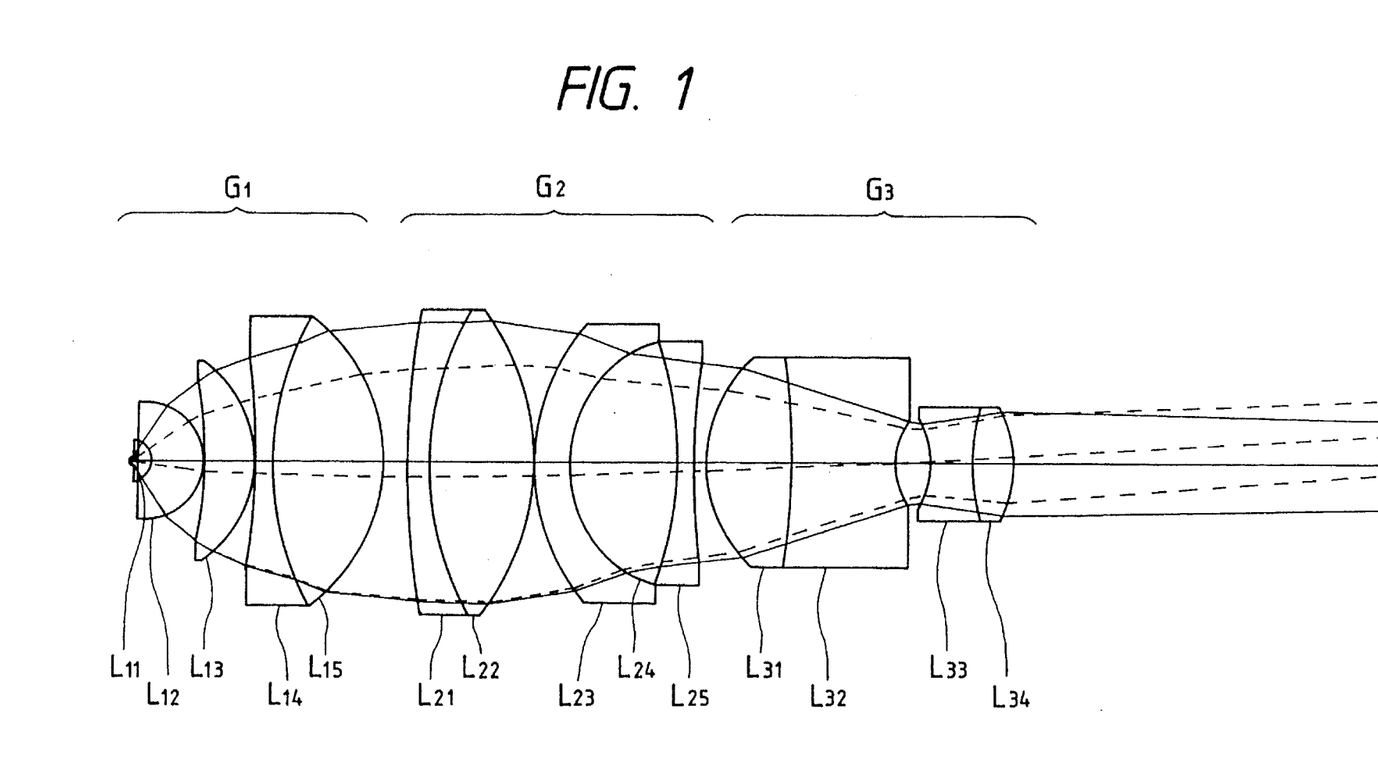
FIG. 1 is a view illustrating a lens layout in a first embodiment of the present invention.
Figure 3:
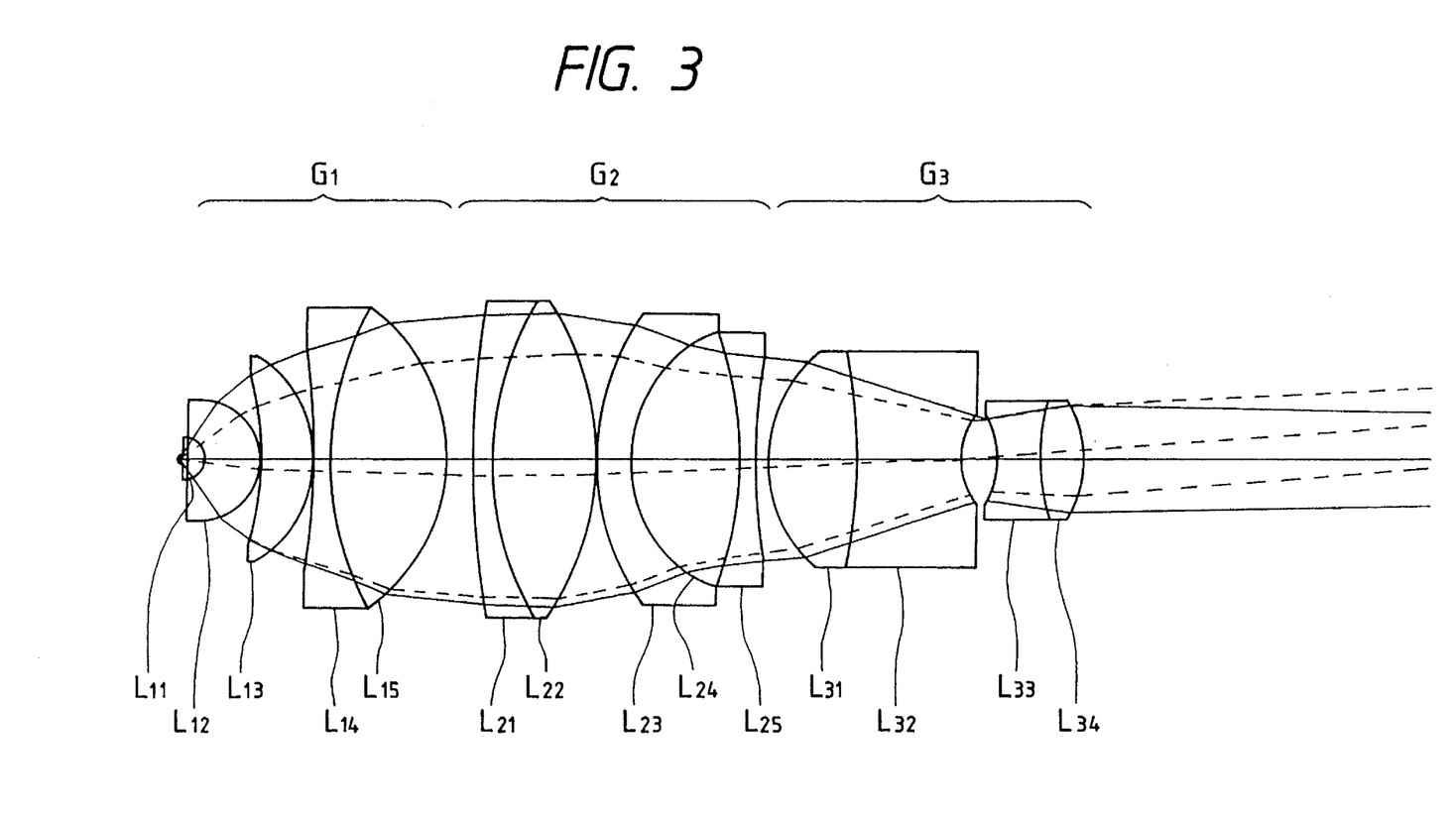
FIG. 3 is a view illustrating a lens layout in a second embodiment of the present invention.
Figure 5:
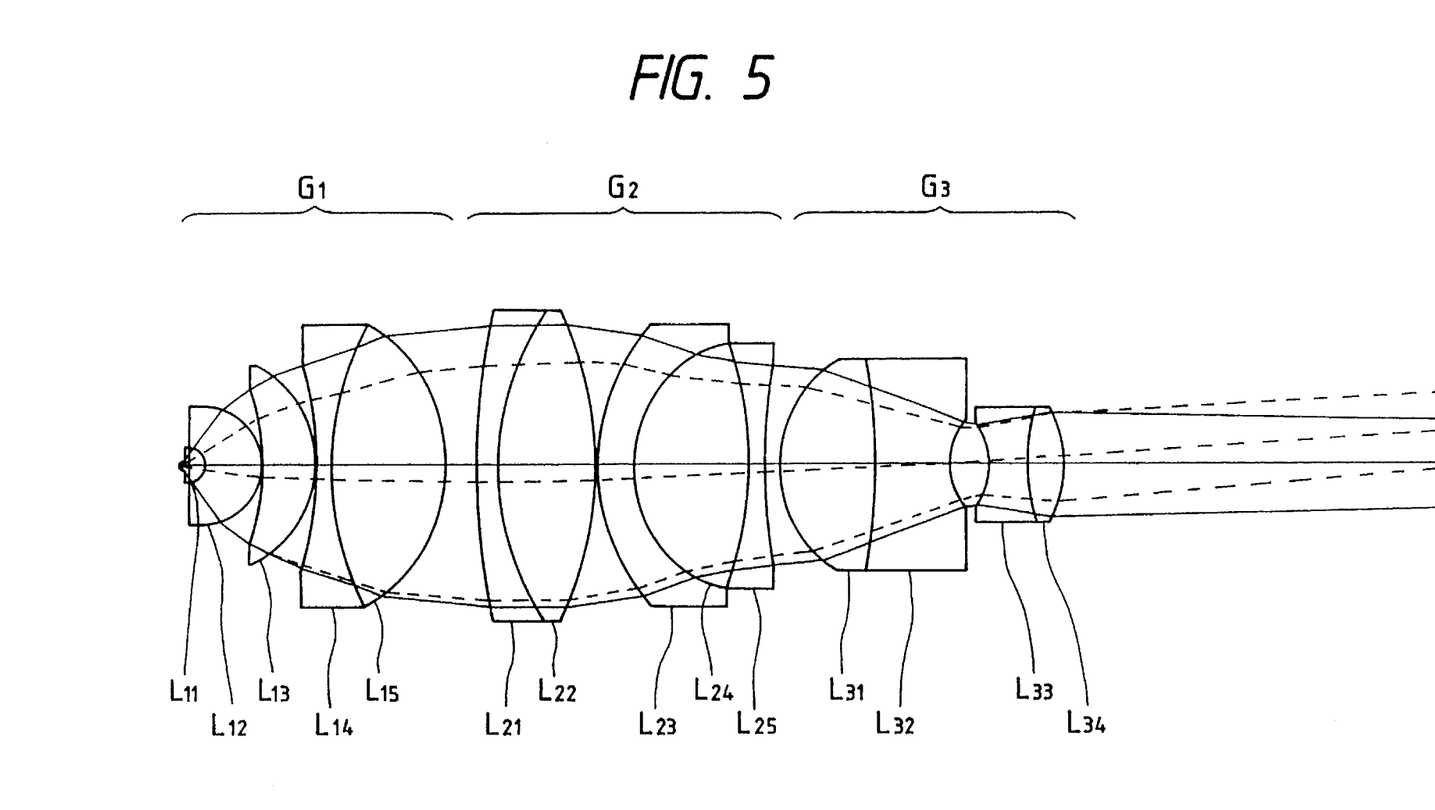
FIG. 5 is a view illustrating a lens layout in a third embodiment of the present invention.

FIGS. 1, 3 and 5 are views illustrating respectively layouts of a lens in accordance with first, second and third embodiments of the present invention. In each of these embodiments, the lens has a magnification on the order of $-60\times$ and a numerical aperture N.A. on the order of 1.2.

First Embodiment

Referring first to FIG. 1, a first embodiment will be described. In FIG. 1, a microscope objective lens in the first embodiment is constructed of, sequentially from an object side, a first lens group $G_1$ having positive refracting power, a second lens group $G_2$ shiftable along an optical-axis direction but having positive refracting power and a third lens group $G_3$ having negative refracting power.

Then, the first lens group $G_1$ includes: sequentially from the object side, a cemented lens component composed of a plano-convex lens element $L_{11}$ with its plane surface toward the object side and a meniscus lens element $L_{12}$ with its concave surface toward the object side, this cemented lens component having the positive refracting power as a whole; a meniscus positive lens element $L_{13}$ with its concave surface toward the object side; and a meniscus cemented lens component composed of a biconcave negative lens element $L_{14}$ and a biconvex positive lens element $L_{15}$, this cemented lens component assuming the meniscus configuration as a whole.

The second lens group $G_2$ includes: sequentially from the object side, first sub-group having a cemented lens component composed of a meniscus negative lens element $L_{21}$ with its convex surface toward the object side and a biconvex positive lens element $L_{22}$, this cemented lens component having the positive refracting power as a whole; and second sub-group having a cemented lens component composed of a meniscus negative lens element $L_{23}$ with its convex surface toward the object side, a biconvex positive lens element $L_{24}$ with its strong convex surface toward the object side and a biconcave negative lens element $L_{25}$, this cemented lens component having the negative refracting power as a whole.

Further, the third lens group $G_3$ includes: sequentially from the object side, a cemented lens component composed of a biconvex positive lens element $L_{31}$ with its strong convex surface toward the object side and a biconcave negative lens element $L_{32}$ with its strong concave surface toward an image side, this cemented lens component having the negative refracting power as a whole; and a cemented lens component composed of a biconcave negative lens element $L_{33}$ and a biconvex positive lens element $L_{34}$, this cemented lens component having the negative refracting power as a whole.

Hereinbelow, Table 1 shows values of data in the first embodiment. In Table 1, f is the focal length of the whole system, $\beta$ is the magnification, and NA is the numerical aperture N.A. Further, the numeral in the left end in each Table represents the order from the object side, r is the radius of curvature of the lens surface, d is the interval between the lens surfaces, $n_d$ is the refractive index with respect to the d-line ($\lambda$=587.6 nm), and $v_d$ is the Abbe number in the d-line.

TABLE 1

| f = 2.67, β = −60.0, NA = 1.2 | | | | |
|---|---|---|---|---|
| NO. | r | d | $n_d$ | $v_d$ |
| 1 | 0.000 | 0.850 | 1.45847 | 67.721 |
| 2 | −1.261 | 3.150 | 1.90265 | 35.763 |
| 3 | −3.267 | 0.050 | | |
| 4 | −16.706 | 2.750 | 1.49782 | 82.557 |
| 5 | −6.900 | 0.100 | | |
| 6 | −42.378 | 0.900 | 1.67163 | 38.913 |
| 7 | 17.206 | 6.500 | 1.49782 | 82.557 |
| 8 | −9.973 | ($d_8$) | | |
| 9 | 56.528 | 1.100 | 1.61266 | 44.396 |
| 10 | 18.742 | 5.600 | 1.43388 | 95.568 |
| 11 | −15.780 | 0.100 | | |
| 12 | 12.853 | 1.850 | 1.74400 | 45.064 |
| 13 | 7.457 | 6.100 | 1.43388 | 95.568 |
| 14 | −19.320 | 0.900 | 1.64831 | 33.749 |
| 15 | 34.838 | ($d_{15}$) | | |
| 16 | 7.908 | 4.800 | 1.49782 | 82.557 |
| 17 | −39.358 | 5.700 | 1.52682 | 51.098 |
| 18 | 3.921 | 2.100 | | |

TABLE 1-continued

| f = 2.67, β = −60.0, NA = 1.2 | | | | |
|---|---|---|---|---|
| NO. | r | d | $n_d$ | $v_d$ |
| 19 | −4.661 | 2.400 | 1.69680 | 55.611 |
| 20 | 10.914 | 2.350 | 1.61650 | 30.980 |
| 21 | −6.864 | 145.783 | | |

Following Table 2 shows variable intervals in the first embodiment.

TABLE 2

| Cover Glass Thickness | $d_8$ | $d_{15}$ |
|---|---|---|
| 0.15 mm | 0.400 | 1.725 |
| 0.17 mm | 1.350 | 0.775 |
| 0.18 mm | 1.725 | 0.400 |

Figure 2A:
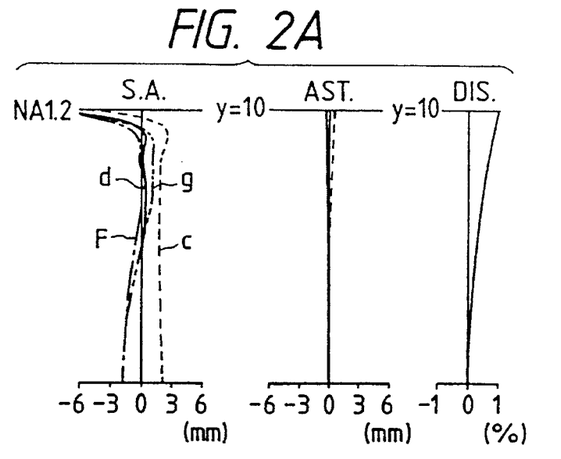
FIGS. 2A, 2B and 2C are diagrams showing a variety of aberrations in the first embodiment.
Figure 2B:
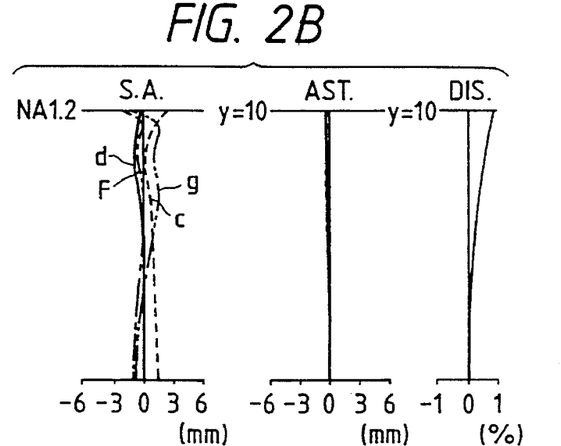
Figure 2C:
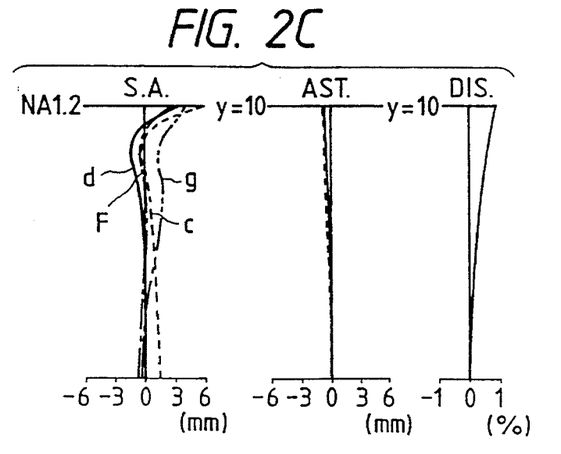

FIGS. 2A through 2C show various aberrations of the microscope objective lens in the first embodiment. Herein, FIG. 2A is a diagram showing a variety of aberrations in a state where a thickness of the cover glass is 0.15 mm. FIG. 2B is a diagram showing the variety of aberrations in a state where the thickness of the cover glass is 0.17 mm (fiducial state). FIG. 2C is a diagram showing the variety of aberrations in a state where the thickness of the cover glass is 0.18 mm. Herein, in a spherical aberration graph (S.A.) of the multiple-aberration diagram, a solid line indicates the spherical aberration with respect to the-d-line (587.6 nm), a broken line indicates the spherical aberration with respect to the C-line (656.3 nm), a one-dotted line indicates the spherical aberration with respect to the F-line (486.1 nm), and a two-dotted line indicates the spherical aberration with respect to the g-line (435.8 nm). Further, in an astigmatism graph (Ast.), the broken line indicates the meridional image surface, while the solid line indicates the sagittal image surface. A graph (Dis.) thereof shows a distortion.

Note that the above multiple-aberration diagrams are given in a state where a medium interposed between the object and the closest-to-object lens element (plano-convex lens element $L_{11}$) is the water ($n_d$=1.33306, $v_d$=53.98), and a material of the cover glass is a white plate glass ($n_d$=1.52216, $v_d$=58.80).

From the multiple-aberration diagrams of FIGS. 2A to 2C, it can be understood that the microscope objective lens in this embodiment well corrects a fluctuation in the aberration due to variation in terms of the thickness of the cover glass, and a good image forming performance is always kept.

Second Embodiment

FIG. 3 illustrates a second embodiment of the present invention. Referring to FIG. 3, the lens layout of the microscope objective lens in the second embodiment is the same as that in the first embodiment of FIG. 1, and, hence, in the explanation thereof will be herein omitted.

Hereinbelow, Table 3 shows values of data in the second embodiment. In Table 3, f is the focal length of the whole system, $\beta$ is the magnification, and NA is the numerical aperture N.A. Further, the numeral in the left end in each Table represents the order from the object side, r is the radius of curvature of the lens surface, d is the interval between the lens surfaces, $n_d$ is the refractive index with respect to the d-line ($\lambda$=587.6 nm), and $v_d$ is the Abbe number in the d-line.

TABLE 3 f = 2.66, β = −60.0, NA = 1.2

| NO. | r | d | $n_d$ | $v_d$ | |
|---|---|---|---|---|---|
| 1 | 0.000 | 0.850 | 1.45847 | 67.721 | |
| 2 | −1.261 | 3.150 | 1.90265 | 35.763 | |
| 3 | −3.267 | 0.050 | | | |
| 4 | −16.374 | 2.750 | 1.49782 | 82.557 | $G_1$ |
| 5 | −6.903 | 0.100 | | | |
| 6 | −43.097 | 0.900 | 1.67163 | 38.913 | |
| 7 | 17.365 | 6.500 | 1.49782 | 82.557 | |
| 8 | −9.973 | ($d_8$) | | | |
| 9 | 54.133 | 1.100 | 1.61266 | 44.405 | |
| 10 | 18.228 | 5.600 | 1.43388 | 95.568 | |
| 11 | −15.801 | 0.100 | | | |
| 12 | 12.952 | 1.850 | 1.74400 | 45.001 | $G_2$ |
| 13 | 7.457 | 6.100 | 1.43388 | 95.568 | |
| 14 | −19.996 | 0.900 | 1.64831 | 33.745 | |
| 15 | 34.749 | ($d_{15}$) | | | |
| 16 | 7.908 | 4.750 | 1.49782 | 82.557 | |
| 17 | −38.411 | 5.750 | 1.52682 | 51.098 | |
| 18 | 3.951 | 2.050 | | | |
| 19 | −4.752 | 2.350 | 1.69680 | 55.611 | $G_3$ |
| 20 | 10.750 | 2.300 | 1.61750 | 30.827 | |
| 21 | −6.967 | 145.904 | | | |

Following Table 4 shows variable intervals in the second embodiment.

TABLE 4

| Cover Glass Thickness | $d_8$ | $d_{15}$ |
|---|---|---|
| 0.15 mm | 0.400 | 1.685 |
| 0.17 mm | 1.370 | 0.715 |
| 0.18 mm | 1.685 | 0.400 |

Figure 4A:
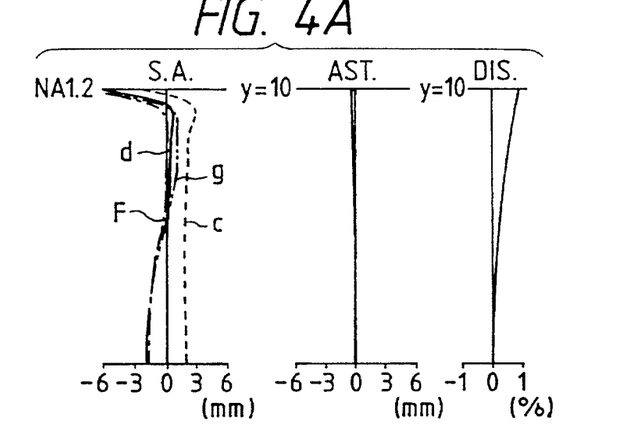
FIGS. 4A, 4B and 4C are diagrams showing the variety of aberrations in the second embodiment.
Figure 4B:
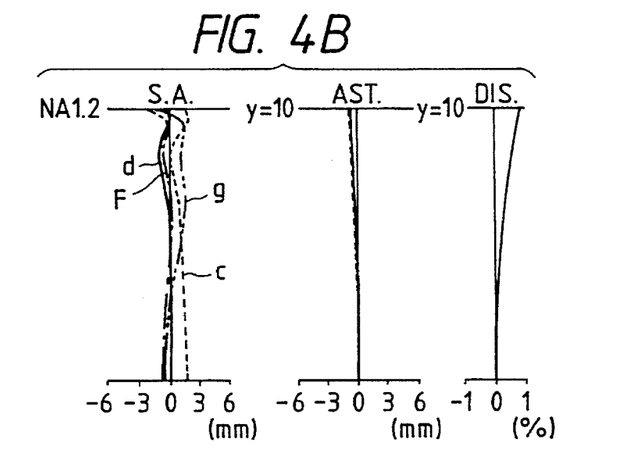
Figure 4C:
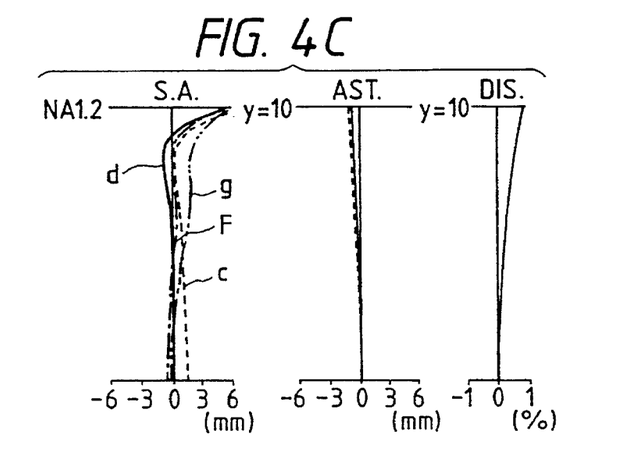

FIGS. 4A through 4C show various aberrations of the microscope objective lens in the second embodiment. Herein, FIG. 4A is a diagram showing a variety of aberrations in a state where a thickness of the cover glass is 0.15 mm. FIG. 4B is a diagram showing the variety of aberrations in a state where the thickness of the cover glass is 0.17 mm (fiducial state). FIG. 4C is a diagram showing the variety of aberrations in a state where the thickness of the cover glass is 0.18 mm. Herein, in a spherical aberration graph (S.A.) of the multiple-aberration diagram, a solid line indicates the spherical aberration with respect to the d-line (587.6 nm), a broken line indicates the spherical aberration with respect to the C-line (656.3 nm), a one-dotted line indicates the spherical aberration with respect to the F-line (486.1 nm), and a two-dotted line indicates the spherical aberration with respect to the g-line (435.8 nm). Further, in an astigmatism graph (Ast.), the broken line indicates the meridional image surface, while the solid line indicates the sagittal image surface. A graph (Dis.) thereof shows a distortion.

Note that the above multiple-aberration diagrams are given in a state where a medium interposed between the object and the closest-to-object lens element (plano-convex lens element $L_{11}$) is the water ($n_d$=1.33306, $v_d$=53.98), and a material of the cover glass is a white plate glass ($n_d$=1.52216, $v_d$=58.80).

From the multiple-aberration diagrams of FIGS. 4A to 4C, it can be understood that the microscope objective lens in this embodiment well corrects the fluctuation in the aberration due to variations in terms of the thickness of the cover glass, and a good image forming performance is always kept.

Third Embodiment

FIG. 5 illustrates a third embodiment of the present invention. The basic lens layout of the microscope objective lens in the third embodiment is the same as that in the first embodiment illustrated in FIG. 1, and, therefore, in the explanation thereof will be herein omitted.

Hereinbelow, Table 5 shows values of data in the third embodiment. In Table 5, f is the focal length of the whole system, β is the magnification, and NA is the numerical aperture N.A. Further, the numeral in the left end in each Table represents the order from the object side, r is the radius of curvature of the lens surface, d is the interval between the lens surfaces, $n_d$ is the refractive index with respect to the d-line (λ=587.6 nm), and $v_d$ is the Abbe number in the d-line.

TABLE 5 f = 2.67, β = −60.0, NA = 1.2

| NO. | r | d | $n_d$ | $v_d$ | |
|---|---|---|---|---|---|
| 1 | 0.000 | 0.750 | 1.45847 | 67.721 | |
| 2 | −1.248 | 3.166 | 1.90265 | 35.763 | |
| 3 | −3.249 | 0.050 | | | |
| 4 | −14.751 | 2.850 | 1.49782 | 82.557 | $G_1$ |
| 5 | −6.526 | 0.100 | | | |
| 6 | −25.581 | 0.900 | 1.67163 | 38.913 | |
| 7 | 18.079 | 6.550 | 1.49782 | 82.557 | |
| 8 | −9.275 | ($d_8$) | | | |
| 9 | 43.000 | 1.200 | 1.52944 | 51.663 | |
| 10 | 16.678 | 5.400 | 1.43388 | 95.568 | |
| 11 | −19.400 | 0.150 | | | |
| 12 | 12.297 | 1.812 | 1.74400 | 45.009 | $G_2$ |
| 13 | 7.295 | 6.300 | 1.43388 | 95.568 | |
| 14 | −20.881 | 1.000 | 1.68893 | 31.079 | |
| 15 | 36.014 | ($d_{15}$) | | | |
| 16 | 7.077 | 5.227 | 1.49782 | 82.557 | |
| 17 | −41.373 | 4.076 | 1.52682 | 51.098 | |
| 18 | 3.497 | 2.300 | | | |
| 19 | −4.517 | 2.100 | 1.69680 | 55.611 | $G_3$ |
| 20 | 9.970 | 2.100 | 1.61650 | 30.980 | |
| 21 | −6.338 | 147.149 | | | |

Following Table 6 shows variable intervals in the third embodiment.

TABLE 6

| Cover Glass Thickness | $d_8$ | $d_{15}$ |
|---|---|---|
| 0.15 mm | 0.400 | 2.050 |
| 0.17 mm | 1.700 | 0.750 |
| 0.18 mm | 2.050 | 0.400 |

Figure 6A:
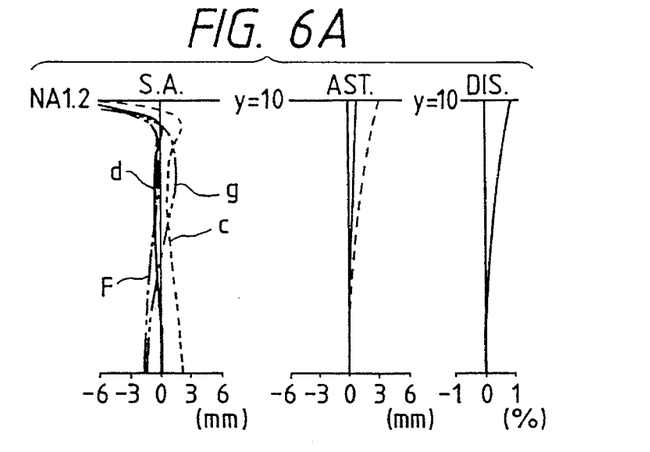
FIGS. 6A, 6B and 6C are diagrams showing the variety of aberrations in the third embodiment.
Figure 6B:
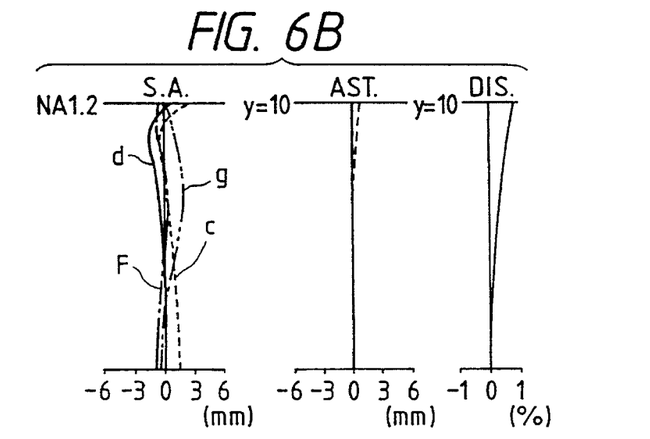
Figure 6C:
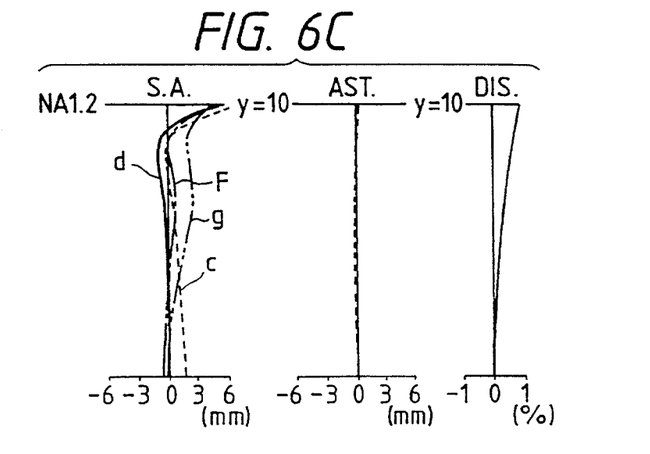

FIGS. 6A through 6C show various aberrations of the microscope objective lens in the third embodiment. Herein, FIG. 6A is a diagram showing a variety of aberrations in a state where a thickness of the cover glass is 0.15 mm. FIG. 6B is a diagram showing the variety of aberrations in a state where the thickness of the cover glass is 0.17 mm (fiducial state). FIG. 6C is a diagram showing the variety of aberrations in a state where the thickness of the cover glass is 0.18 mm. Herein, in a spherical aberration graph (S.A.) of the multiple-aberration diagram, a solid line indicates the spherical aberration with respect to the d-line (587.6 nm), a broken line indicates the spherical aberration with respect to the C-line (656.3 nm), a one-dotted line indicates the spherical aberration with respect to the F-line (486.1 nm), and a two-dotted line indicates the spherical aberration with respect to the g-line (435.8 nm). Further, in an astigmatism graph (Ast.), the broken line indicates the meridional image surface, while the solid line indicates the sagittal image surface. A graph (Dis.) thereof shows a distortion.

Note that the above multiple-aberration diagrams are given in a state where a medium interposed between the object and the closest-to-object lens element (plano-convex lens element $L_{11}$) is the water ($n_d=1.33306$, $v_d=53.98$), and a material of the cover glass is a white plate glass ($n_d=1.52216$, $v_d=58.80$).

From the multiple-aberration diagrams of FIGS. 6A to 6C, it can be understood that the microscope objective lens in this embodiment well corrects the fluctuation in the aberration due to variations in terms of the thickness of the cover glass, and a good image forming performance is always kept.

Following Table 7 shows condition corresponding numerical values of the microscope objective lens in the first through third embodiments discussed above.

TABLE 7

|     | First Embodiment | Second Embodiment | Third Embodiment |
| --- | --- | --- | --- |
| (1) | $1.26 \times 10^{-3}$ | $1.26 \times 10^{-3}$ | $1.30 \times 10^{-3}$ |
| (2) | $5.51 \times 10^{-3}$ | $5.53 \times 10^{-3}$ | $5.46 \times 10^{-3}$ |
| (3) | $4.65 \times 10^{-2}$ | $4.67 \times 10^{-2}$ | $4.56 \times 10^{-2}$ |
| (4) | $2.45 \times 10^{-2}$ | $2.47 \times 10^{-2}$ | $2.18 \times 10^{-2}$ |
| (5) | $1.33 \times 10^{-2}$ | $1.31 \times 10^{-2}$ | $1.53 \times 10^{-2}$ |

Thus, each of the embodiments of the present invention satisfies all the conditions, and it is therefore possible to obtain the good image forming performance at all times even when shifting the second lens group $G_2$.

Note that the microscope objective lens system in each of the embodiments discussed above is defined as a so-called finite system objective lens which forms an image of a finite-distance object at a finite distance. Herein, in each of the above-discussed embodiments, if the refracting power of the third lens group $G_3$ is intensified in one direction, the objective lens of an infinite system can be obtained.

As described above, according to the first through third embodiments, even if there are variations in the thickness of the cover glass or in the refractive index, the well-formed image can be always obtained. Further, the medium between the object and the lens element is the water, and, hence, there is yielded such an advantage that a decline in terms of an operability can not be induced.

It is apparent that, in this invention, a wide range of different working modes can be formed based on the invention without deviating from the spirit and scope of the invention. This invention is not restricted by its specific working modes except being limited by the appended claims.

What is claimed is:

1. An objective lens system for a microscope comprising, sequentially from an object side:

a first lens group having positive refracting power;

a second lens group shiftable in an optical-axis direction; and a third lens group, wherein said first lens group has a cemented lens component comprising a plano-convex lens element with its plane surface toward the object side and a meniscus lens element with its concave surface toward the object side, said second lens group has a first sub-group having positive refracting power and a second sub-group having negative refracting power, said second sub-group has a negative meniscus lens element with its concave surface toward an image side, said third lens group has a meniscus cemented lens component with its concave surface toward the image side, and said objective lens system satisfies the following conditions:

$$-4.1 \times 10^{-3} < \frac{f}{(f_2 \times -\beta)} < 4.2 \times 10^{-3}$$

$$2.5 \times 10^{-3} < \frac{n_1}{n_2} \times \frac{R_1}{f \times \beta} < 8.3 \times 10^{-3}$$

$$3.3 \times 10^{-2} < \frac{R_2}{f \times -\beta} < 8.3 \times 10^{-2}$$

$$1.6 \times 10^{-2} < \frac{R_3}{f \times -\beta} < 4.2 \times 10^{-2}$$

$$8.3 \times 10^{-3} < \frac{d_1 + d_2}{f \times -\beta} < 5 \times 10^{-2}$$

where f: the focal length of the whole system, $f_2$: the focal length of said second lens group, $\beta$: the lateral magnification of said microscope objective lens, $n_1$: the refractive index of said plano-convex lens element of said first lens group, $n_2$: the refractive index of said meniscus lens element of said first lens group, $R_1$: the radius of curvature of an object-side lens surface of said meniscus lens element of said first lens group, $R_2$: the radius of curvature of an image-side lens surface of said negative meniscus lens element of said second sub-group, $R_3$: the radius of curvature of an image-side lens surface of said cemented lens component of said third lens group, $d_1$: the air spacing between said first and second lens groups, and $d_2$: the air spacing between said second and third lens groups.

2. An objective lens system for a microscope according to claim 1, wherein said first and second sub-groups are sequential from the object side.

3. An objective lens system for a microscope according to claim 1, wherein said second lens group has a positive refracting power as a whole.

4. An objective lens system for a microscope according to claim 1, wherein said third lens group has a negative refracting power as a whole.

5. An objective lens system for a microscope according to claim 1, wherein said objective lens system is a finite lens system.

* * * * *